United States Patent [19]
Nguyen et al.

[11] Patent Number: 5,555,433
[45] Date of Patent: Sep. 10, 1996

[54] CIRCUIT FOR INTERFACING DATA BUSSES

[75] Inventors: Uoc H. Nguyen, Long Beach; Sam Su, Rowland Heights; Li-Fung Cheung, Alhambra; George Apostol, Santa Clara, all of Calif.

[73] Assignee: Xerox Corporation, Stamford, Conn.

[21] Appl. No.: 259,403

[22] Filed: Jun. 13, 1994

[51] Int. Cl.$^6$ .......................................... G06F 9/00
[52] U.S. Cl. ................ 395/800; 364/238; 364/238.2; 364/240.4; 364/247; 364/DIG. 1; 395/280
[58] Field of Search ................... 395/800, 200, 395/325

[56] References Cited

U.S. PATENT DOCUMENTS 5,056,093  10/1991  Whetsel ........................ 371/22.3
5,129,062   7/1992  Gygi ............................. 395/250
5,291,489   3/1994  Morgan .......................... 370/85.1

Primary Examiner—Eric Coleman
Attorney, Agent, or Firm—Robert Cunha

[57] ABSTRACT

A system for changing the source and destination devices of data transfers under software control. Default data transfers are made from numbered source devices to the same-numbered destination devices, the data requests being routed through multiplexers which pair, for example, source 1 with destination 1, source 2 with destination 2, etc. The multiplexer control signals originate in a register which is originally loaded with default control bits. However, in real time, the bits within the control register can be re-loaded to provide outputs other than the default values. Then, the data from a source can be directed to any one of the destination devices.

1 Claim, 4 Drawing Sheets ctrl bits[09-08] = '00' position 4--(default)
ctrl bits[09-08] = '01' position 5
ctrl bits[09-08] = '10' position 6
ctrl bits[09-08] = '11' position 7 ctrl bits[11-10] = '00' position 4
ctrl bits[11-10] = '01' position 5 -(default)
ctrl bits[11-10] = '10' position 6
ctrl bits[11-10] = '11' position 7 ctrl bits[13-12] = '00' position 4
ctrl bits[13-12] = '01' position 5
ctrl bits[13-12] = '10' position 6--(default)
ctrl bits[13-12] = '11' position 7 ctrl bits[15-14] = '00' position 4
ctrl bits[15-14] = '01' position 5
ctrl bits[15-14] = '10' position 6
ctrl bits[15-14] = '11' position 7--(default)

Normal states: ExtDReq0 is paired with ExtDReq4 for an L2L transfer
ExtDReq1 is paired with ExtDReq4 for an L2L transfer
ExtDReq2 is paired with ExtDReq4 for an L2L transfer
ExtDReq3 is paired with ExtDReq4 for an L2L transfer

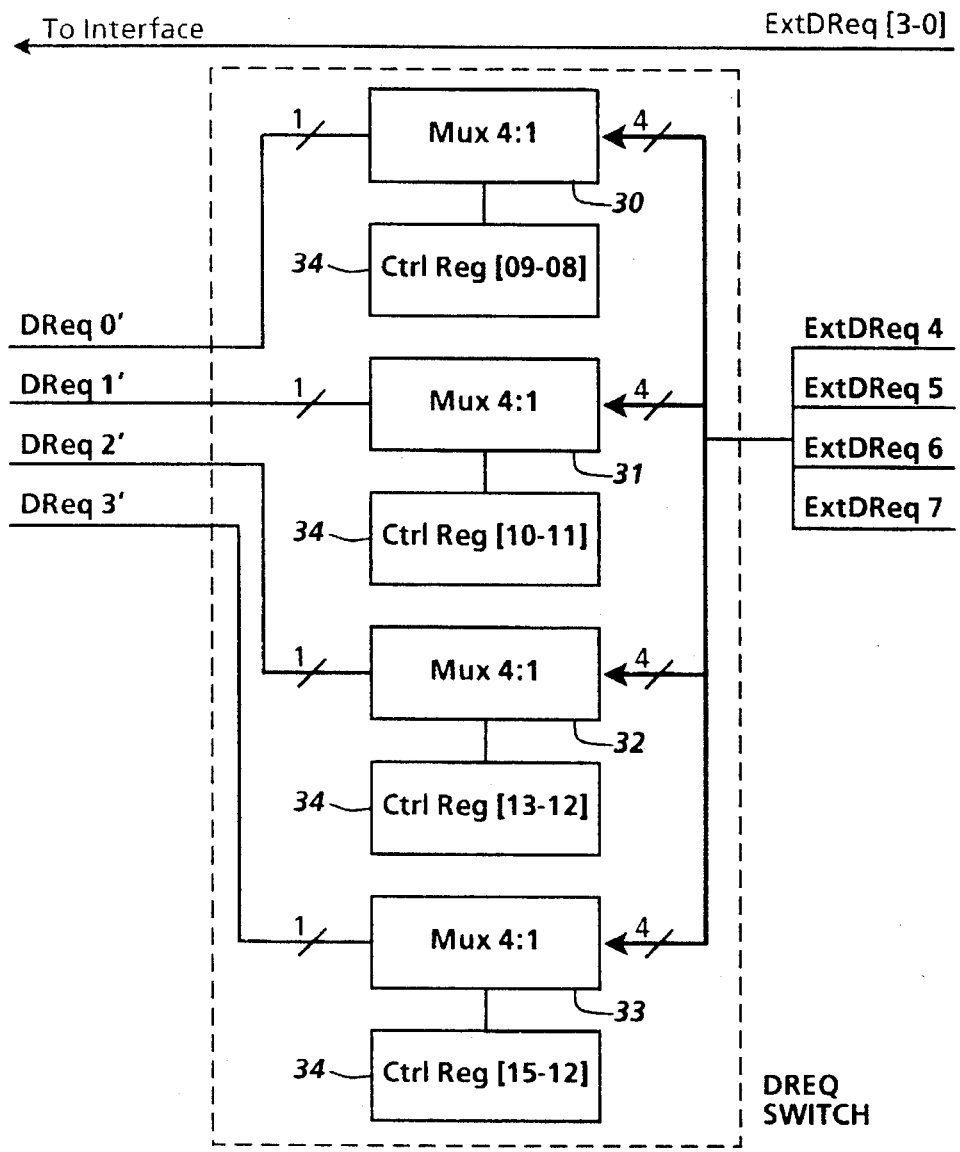

ctrl bits[09-08] = '00' position 4--(default)   ctrl bits[11-10] = '00' position 4
ctrl bits[09-08] = '01' position 5              ctrl bits[11-10] = '01' position 5 -(default)
ctrl bits[09-08] = '10' position 6              ctrl bits[11-10] = '10' position 6
ctrl bits[09-08] = '11' position 7              ctrl bits[11-10] = '11' position 7 ctrl bits[13-12] = '00' position 4              ctrl bits[15-14] = '00' position 4
ctrl bits[13-12] = '01' position 5              ctrl bits[15-14] = '01' position 5
ctrl bits[13-12] = '10' position 6--(default)   ctrl bits[15-14] = '10' position 6
ctrl bits[13-12] = '11' position 7              ctrl bits[15-14] = '11' position 7--(default)

Normal states:  ExtDReq0 is paired with ExtDReq4 for an L2L transfer
                ExtDReq1 is paired with ExtDReq4 for an L2L transfer
                ExtDReq2 is paired with ExtDReq4 for an L2L transfer
                ExtDReq3 is paired with ExtDReq4 for an L2L transfer

*FIG. 2*

CIRCUIT FOR INTERFACING DATA BUSSES

BACKGROUND OF THE INVENTION

An improved interface circuit for allowing data to be transmitted between two data busses wherein the interface contains a FIFO buffer per channel for transmitting the data in either direction, and wherein the source and destination of the data can be switched in real time to provide additional flexibility in transmitting data.

In normal computer systems which process data in the form of numbers or character coded text, the data rate is usually modest, perhaps eight bits for a character and four bits for a numerical digit, resulting in thousands of bits per page. In this case the system is normally able to process the data in the software. However, in systems that process images, the data rates are very high, easily reaching up into the millions of bits per page, and to allow the computer to keep up with the printer speed, "accelerator" cards are frequently used. These are specially designed hardware circuits which accomplish specific image handling functions such as compression, decompression and image rotation.

Normally, these accelerator cards are extra circuit boards which may be plugged into the CPU backplane and transmit data over the existing data bus. However, in high speed systems the amount of data transmitted between accelerator cards overloads the data bus. One solution is to provide a separate data bus for the accelerator cards, herein called a local, or "L" bus, in addition to the system, or "S" bus. Then, between these two busses there must be an interface circuit.

It frequently happens that after data is decompressed or rotated, it will be sent to a printer. Similarly, data received from a scanner may be compressed. Therefore, from a system optimization viewpoint, it is appropriate that I/O devices such as the scanner and printer also be connected to the L bus.

On the other hand, the disk have very limited speed compared to the printer, and images may have to be transmitted to, and accumulated in, the main memory before printing of the entire page is possible. This necessitates the frequent transmission of large amounts of image data across the interface circuit between the L bus and the S bus.

A problem with interface circuits is that, after they are designed, new uses may be thought of that the interface was not designed for. As an example, let us assume that the anticipated data flow would be from input scanner to compressor to disk for storage of the image until it is needed; then disk to main memory for temporary storage; and finally, transmission from main memory to decompressor to printer. Later in the development cycle, or even when the customer is using the product, it is discovered that it would be useful to store fully assembled page bit maps on disk for later use. This would require a transfer from main memory directly to disk. However, the original design did not plan for a transfer from the main memory to the disk. In this case, the board would have to be redesigned to enable it to add the new data path. It would be advantageous if the connections were under software control so that new data paths could be implemented by software request.

SUMMARY OF THE INVENTION

This invention accomplishes this objective by making all interconnections controllable by Data Request (DReq) commands which control a number of multiplexers, and by generating these commands in the software. Then, by simply generating new DReq's, new data paths are implemented.

BRIEF DESCRIPTION OF THE DRAWINGS

FIG. 2 shows the programmability of the D Request lines.

DETAILED DESCRIPTION OF THE INVENTION

Figure 1:
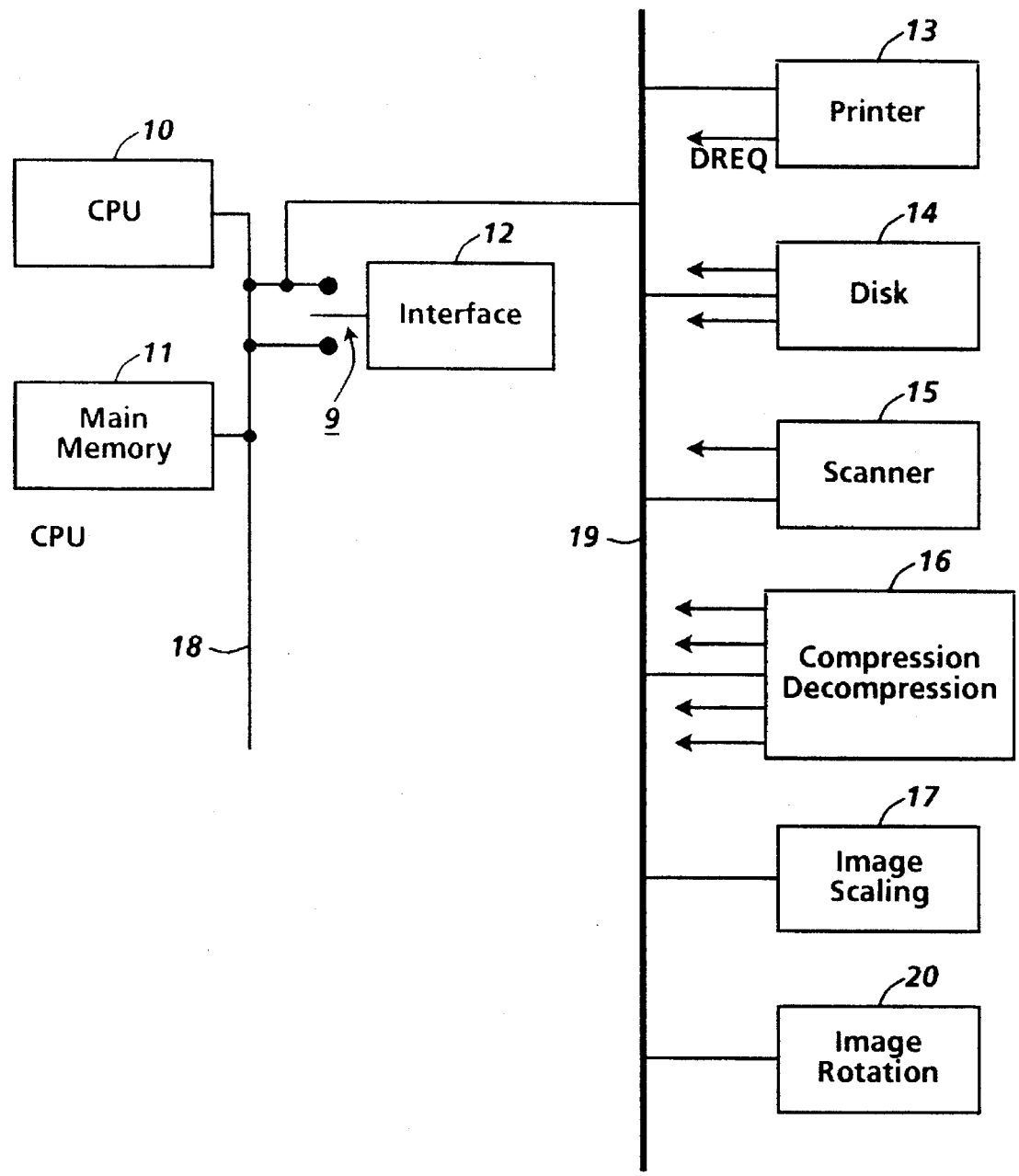
FIG. 1 is an overall block diagram of the system.

FIG. 1 shows the CPU 10 and the system memory 11 connected by a System S Bus 18. For high speed image handling there is provided any number of accelerator cards such as a compressor/decompressor card 16 and an image rotator 20. These are connected by the local L Bus 19. Since data from the system scanner 15 is normally compressed before storage, and the data to the printer must be decompressed before printing, the scanner interface card 15 and the printer driver 13 are also connected to this L Bus 19. Other examples of cards that may be attached to the L Bus are a disk driver 14 and an image scaler 17.

Finally, the L Bus 19 and the S Bus 18 are connected by the interface 12 which is essentially eight channels, each having two FIFO buffers, one for each direction (S to L and L to S), with one exception. Since it frequently happens that the transmission of data is between cards on the L Bus, the L to S buffer is configured so that the transmission can be from the L Bus back to the L Bus. This is illustrated conceptually by switch 9, although any other equivalent software or hardware alternative could be used. In other words, for example, the decompressor 16 output is not sent directly to the printer 13 but is instead sent through the interface buffer 12.

When a device needs data, or when a device wants to transmit data, it sends out a D Request (DReq) on a control line to the Interface 12. The interface stores up to eight D Requests. Some devices, such as the compressor, may either receive or transmit data, and therefore needs two control lines. Other cards, which can only request data. like the printer driver, can only output one kind of D Request and so have only one control line. Using these rules, the compressor/decompressor card actually needs 4 lines, since the compressor function needs 2 (one to identify that data is needed to be input, and one to identify that data needs to be output) and, similarly, the decompressor needs two. Considering that the interface can process only eight request lines, a limited number of cards may be active at one time in this embodiment. However, if it is required, the number of D Request lines can be expanded to a number larger than 8.

The following is an example of how control lines are paired.

| 0 | Decompressor | In |
| 1 | Compressor | In |
| 2 | Disk | In |
| 3 | IOT | In |
| 4 | Decompressor | Out |
| 5 | Compressor | Out |
| 6 | Disk | Out |
| 7 | Scanner | Out |

Since the circuit is limited to activating and pairing only one line from the first four and one line from the second four to form a DReq, it is necessary that all input functions and output functions are grouped together as shown. Examples of possible transmissions between devices would be, transmission of raw data from the scanner through the interface, L (bus) to L (bus) to the compressor, and then, through the interface, L to L, to the disk for storage. This total transfer requires two trips through the interface and would therefore require two D requests. Another example would be compressed data from the disk through the interface, L to S, to the main memory for temorary storage, through the interface, S to L, to the decompressor for decompression into an image, and transmission of that image through the interface, L to L, to the printer for printing. This would require three D requests. This total sequence would result in the normal process of scanning and printing a picture, and assumes a disk that runs much slower than the printer. If the disk were as fast as the printer, data could be sent directly from the disk to the printer. Similarly, data could be sent from the scanner to the printer if the scanner was as fast as the printer.

An example of a data transfer that was not designed into the original product, but that was later determined to be a useful option is the transfer of data from the decompressor to the compressor. This would be useful when the data is compressed in one format and will eventually be needed in a different format. This is an example of a process that would have required a redesign of the interface board in a prior art interface, but one which can be provided easily by software control in this embodiment.

As shown in the example above, let us assume that line 7 is attached to the scanner 15 "Out" data request control line, and that line 1 is attached to the Compressor "In" request control line, and that the interface has been configured to connect line 1 to 7. Now if both lines 1 and 7 are active, the interface will take data from the scanner on the L bus and send it back out on the L bus to the compressor, which is the first step described in the previous paragraph. All other transfers are accomplished similarly.

Any set of lines, such as 0–3 being coupled to 4–7 respectively, can be assigned as defaults, but can be changed in real time to any other arrangement. However, no device changes are allowed from the first group to the second. In other words, the decompressor must use one of the second four lines, and both the printer driver and the disk driver must use one of the first four lines. Thus,, there can never be a transfer of data from the compressor to the scanner. Also, one line is used in an S to L or L to S transfer since only one device has to be declared, the other is understood to be the CPU Memory, since it is the only device on the S bus. However, in the case of an L to L transfer, two request lines are needed to name the two devices. To restate this relationship, if the first four lines are considered to be group A and the second four are considered to be Group B, then an L to L transfer is possible only between D Requests belonging to different groups, and no L to L transfer is allowed between requests of the same group.

FIG. 2 shows how this matching of requests can be changed by the software. The circuit shown is for one of the two groups and is made up from four multiplexers 30–34 and one control register 34 having 8 control bits. Each mux 30–33 has one output and is labelled DReq 0 through 3. The inputs are D Requests numbered 4 through 7. The control register is loaded by the CPU so that each multiplexer will choose the predetermined input to be used as its output. In this way, for example, Mux 30 can choose any of D Requests 1–7 to use as its output D Request 0. In the default condition 4 will go to 0, 5 to 1, etc. This default condition will normally be used for L to L transfers. All of the other possibilities must be programmed. As shown, D Requests 0–3 are always left in their unmodified state and only the last four D Requests are multiplexed.

Each possibility is allowed once as shown in the example below, but it happens that these pairings occasionally become mis-programmed. To prevent this, a small array is used to check that the possibilities are selected only once. First, the contents of the register is sent to an OR circuit to determine if each select line 4–7 is selected at least once. Then all the OR output bits are checked to make sure that all have been selected at least once. An error is indicated by a 0 output bit, and the error interrupt is set.

EXAMPLE

DReq0 is paired with DReq 6, the control bits [09–08] are '10'.

DReq1 is paired With DReq 4, the control bits [11–10] are '00'.

DReq2 is paired with DReq 7, the control bits [13–12] are '11'.

DReq3 is paired with DReq 5, the controls bits [15–14]are '01'.

The algorithm is as follows:

1. A table reflecting the state of the switches is created:

| DReq paried with | 7 6 5 4 |
|---|---|
| DReq0 | 0 1 0 0 (DReq6 is used, therefore a '1' is set at position 6) |
| DReq1 | 0 0 0 1 |
| DReq2 | 1 0 0 0 |
| DReq3 | 0 0 1 0 |

2. The columns are Logical ORed into a single row.
3. The bits of the newly creasted row are then logicallu ANDed together
4. The result of the ANDing should be a 'ONE' if the programming is correct.

Correct porgramming

| position | 7 6 5 4 |
|---|---|
| DReq0 | 0 1 0 0 |
| DReq1 | 0 0 0 1 |
| Dreq2 | 1 0 0 0 |
| DReq3 | 0 0 1 0 |
| Column OR | 1 1 1 1 |
| Row AND | 1, and no error interrupt is activated. | incorrect programming

| position | 7 6 5 4 |
|---|---|
| DReq0 | 0 1 0 0 |
| DReq1 | 0 1 0 0 |
| DReq2 | 1 0 0 0 |
| DReq3 | 0 0 1 0 |
| Column OR | 1 1 1 0 |
| Row AND | 0 and the error interrupt is set |

Figure 3:
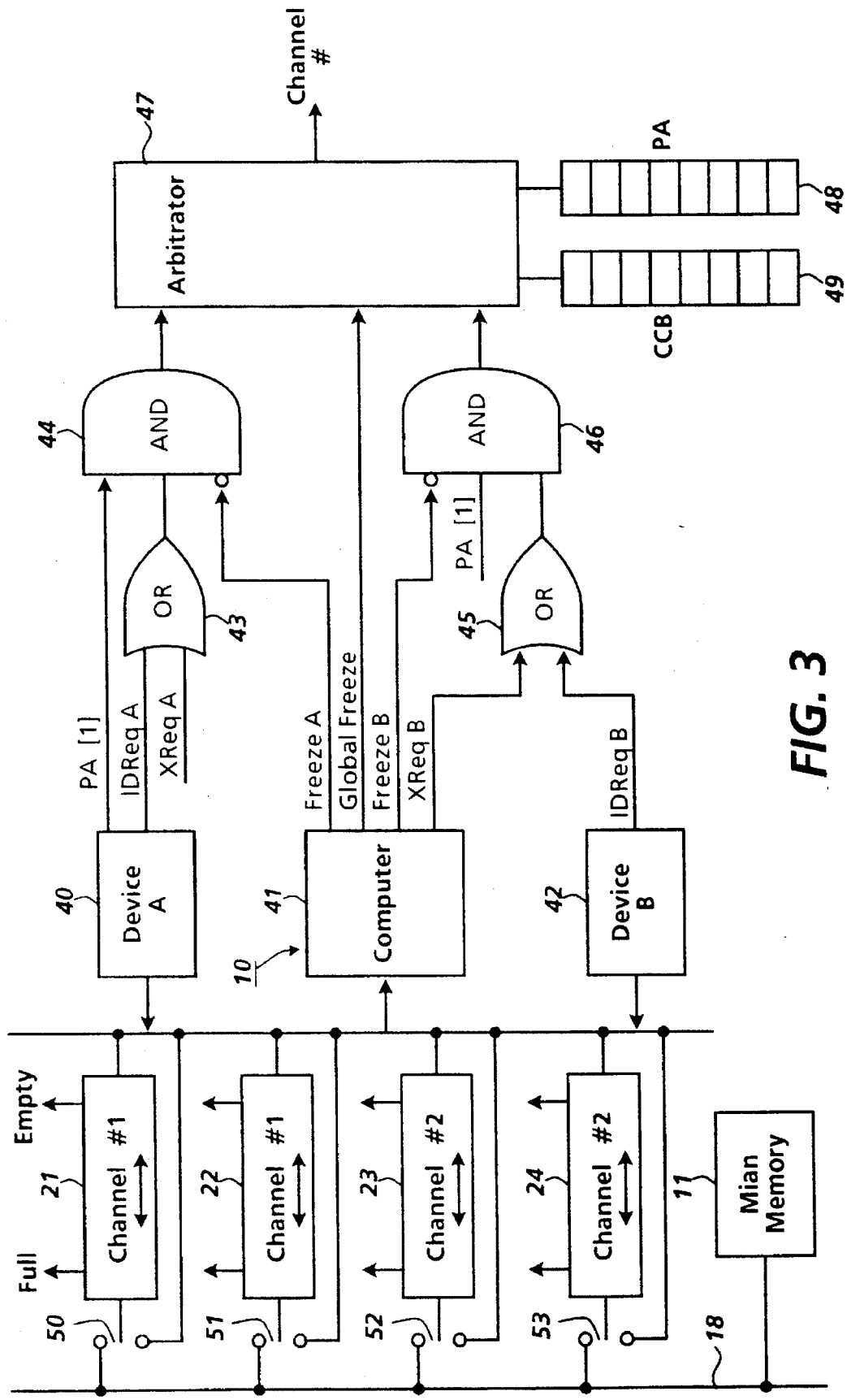
FIG. 3 is a block diagram of the interface buffers.

FIG. 3 shows the organization of the FIFO buffers and surrounding circuitry. The total of FIFO's are assembled from 16 buffers, each of which can store 8 packets, each packet being 32 bytes long. Since the data is traveling in both directions, and there is a ping pong organization, a total of 4 buffers 21–24 are needed for the two channels, which are shown in this FIG. In addition, each FIFO outputs "full" and "empty" signals.

Data transfers are controlled by blocks of information called Chain Control Blocks (CCB's) which are loaded into the CCB register 49 from the computer 10. Each contains the address of the source and destination of the data packet to be transferred, the width of the data (8 or 16 bits) and the packet count (in 32 byte packets). In a typical Direct Memory Acecess (DMA) operation, a packet of data is to be put in memory starting at a designated location, and the data will be entered directly without intervention by the CPU. In this application the data will either be transmitted between the main memory and a device in a DMA sequence, or between two devices, using the same sequence.

The examples of devices shown here are labelled device A, 40, and device B, 42, and , because the pairings are under software control, as explained above, these devices could be paired to any two of the eight channels. In this example, Device A is shown as a source of data and device B is shown as a data sink. When device A is ready to transmit data it will issue a packet available (PA) signal (which will also be saved in register 48) and an internal data request, IDReq. In the alternative, if some other device, or the main memory, is requesting data from device A, the requesting device will issue an external data request, XDReq, and wait for a packet to be available from device A. If there is either request at the input of OR gate 43, the OR gate output will be ON, and when a packet is available, the output of AND gate 44 will go high.

The circuit for device B is similar except that it is a data sink. Therefore, the packet available signal will come from intended the data source.

In the common event that several data channels are requesting a data transfer at the same time, the arbitrator 47 will inspect the various CCB's, packet available signals, and the gate 44, 46 outputs and decide as a matter of priority which device pair will get control of the two data busses for the next transmission. The output of the arbitrator is a number specifying the device pair.

In the event that a single channel is to be frozen, a freeze signal will be applied to the associated one of the OR gates 43, 45. This has the effect of blocking the DReq of the data source device. In the alternative, a global freeze can be applied to the arbitrator 47, which has the effect of blocking all DReq's. At this point, the data in all of the buffers 21–24, and all of the registers such as the CCB register 49 and main memory 11, can be modified. Finally, the freeze signal is removed and operation will continue.

Figure 4:
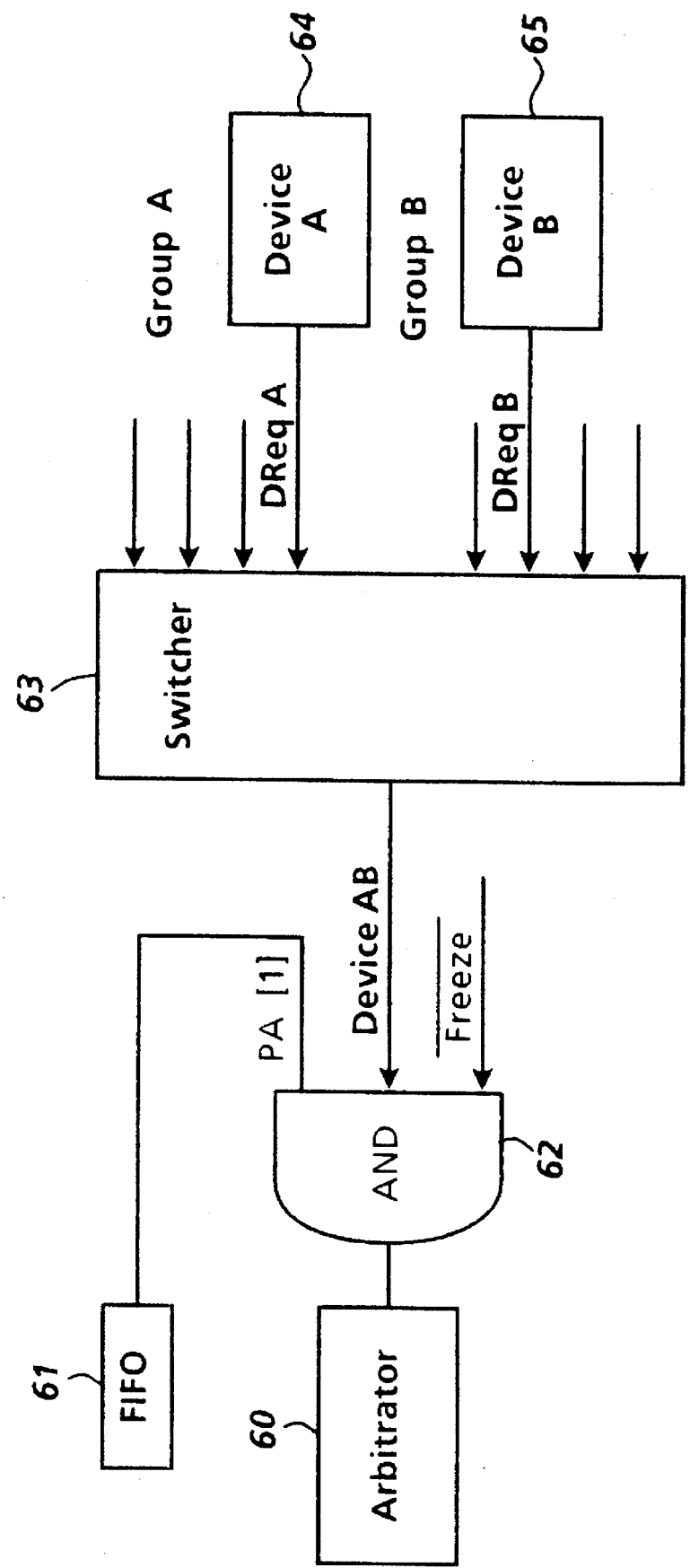
FIG. 4 is an alternative embodiment of the logic connecting the devices and the arbitrator.

An alternative embodiment of the logic connecting the devices and the arbitrator is shown in FIG. 4. Eight DREQ inputs from devices 64, 65 are shown for the switcher 63, four from group A, four from group B. The switcher is configured to match pairs of inputs and will output a combined output, here showing, as an example, a combined AB output. If a packet is available from, or to, the FIFO 61, and if the Device AB signal is present, and if the "not freeze" signal is high, the gate 62 will generate an output to the arbitrator.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A computer system including a plurality of data source devices, a plurality of data destination devices, and a circuit for determining which source device will be coupled to each destination device, the system comprising:

n data source devices, numbered 0 to n-1, each for generating a data request signal indicating that said source device is ready to output data, n data destination devices, numbered 0 to n-1, each for generating a data request signal indicating that said destination device is ready to receive data, n means for multiplexing, each having n input lines, each of said input lines being coupled to the data request signal of each of said destination devices, each multiplexing means having one output line, the output lines of said multiplexer means being numbered 0 to n-1 which identify the number of the associated source device, each means for multiplexing further comprising a register having a number of control bits for controlling which of said input lines to each multiplexer means will be selected for coupling to that multiplexer's output line, means for loading said registers with said control bits, and means for transmitting data from a numbered source device to the selected destination device when data request signals are produced by both said numbered source device and said selected destination device.

\* \* \* \* \*